US012625554B2

(12) United States Patent
Won

(10) Patent No.: US 12,625,554 B2
(45) Date of Patent: May 12, 2026

(54) MULTI-CHANNEL SOFT-SENSOR-BASED INTERFACE DEVICE, AND OPERATING METHOD

(71) Applicant: Korea Electronics Technology Institute, Seongnam-si (KR)

(72) Inventor: Yun Jae Won, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 1 day.

(21) Appl. No.: 18/937,675

(22) Filed: Nov. 5, 2024

(65) Prior Publication Data

US 2025/0060819 A1     Feb. 20, 2025

Related U.S. Application Data

(63) Continuation of application No. PCT/KR2023/003284, filed on Mar. 10, 2023.

(30) Foreign Application Priority Data

Mar. 31, 2022     (KR) ........................ 10-2022-0040549
Apr. 22, 2022     (KR) ........................ 10-2022-0050187

(51) Int. Cl.
*G06F 3/01*          (2006.01)
(52) U.S. Cl.
CPC .................................... *G06F 3/014* (2013.01)
(58) Field of Classification Search
CPC ........... G06F 3/014; G06F 3/016; G06F 3/011
See application file for complete search history.

(56) References Cited

U.S. PATENT DOCUMENTS

2004/0034505 A1* 2/2004 Kimble .................... G06F 3/014
                                                    702/182
2016/0162022 A1* 6/2016 Seth ........................ G06F 3/017
                                                    345/156

FOREIGN PATENT DOCUMENTS

| JP | 2013-132195 A | 7/2013 |
|---|---|---|
| KR | 20-0260029 Y1 | 1/2002 |
| KR | 10-2005-0031458 A | 4/2005 |
| KR | 10-1781999 B1 | 9/2017 |
| KR | 10-1798554 B1 | 12/2017 |

(Continued)

OTHER PUBLICATIONS

International Search Report mailed on Jul. 3, 2023 in International Application No. PCT/KR2023/003284, in 5 pages.

*Primary Examiner* — Towfiq Elahi
(74) *Attorney, Agent, or Firm* — Knobbe, Martens, Olson & Bear, LLP

(57) ABSTRACT

Proposed is a multi-channel soft-sensor-based interface device and an operating method therefor. The glove-type multi-channel soft-sensor-based interface device can recognize the degree of flexibility of finger joints. The device may include a sensing module which includes a plurality of strain sensors and which collects strain sensing signals of the plurality of strain sensors. The device may also include a switching unit configured to select any one of the strain sensing signals of the plurality of strain sensors. The device may further include an amplification module configured to amplify the strain sensing signal selected by the switching unit. The device may further include an analog-to-digital (A/D) converter configured to convert the amplified sensing signal into a digital signal.

9 Claims, 19 Drawing Sheets

(56) References Cited

FOREIGN PATENT DOCUMENTS

| | | | |
|---|---|---|---|
| KR | 10-2052941 | B1 | 12/2019 |
| WO | WO 2019/173678 | A1 | 9/2019 |

\* cited by examiner

CHANGE IN RESISTANCE ACCORDING TO
CHANGE IN SENSOR LENGTH

R program:
set_pwm 255
wait 100
set_pwm 0
wait 100
trigger sg
end

G program:
trigger wr
set_pwm 255
wait 100
set_pwm 0
wait 100
trigger sb
end

B program:
trigger wg
set_pwm 255
wait 100
set_pwm 0
end

Figure 16:
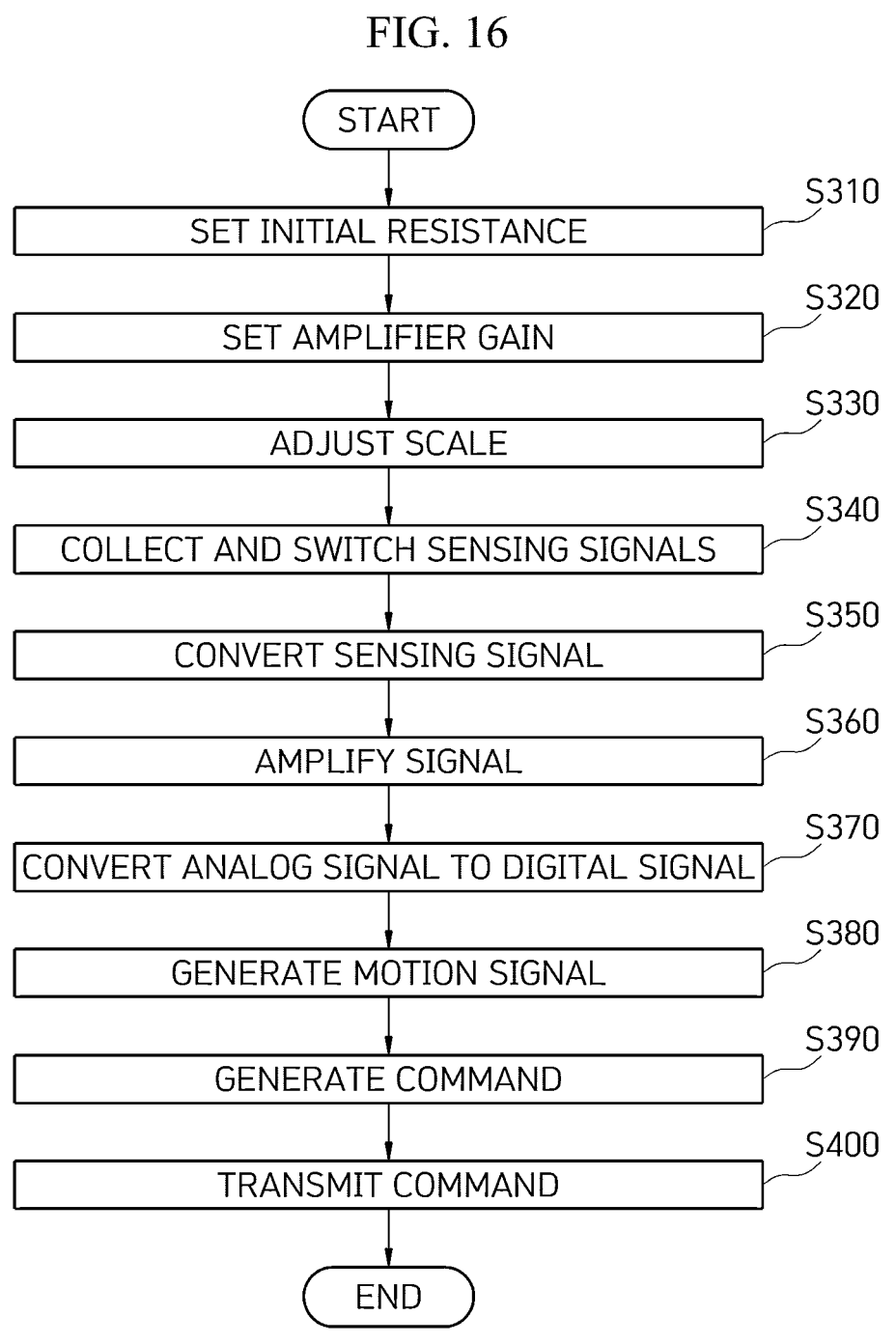

START

SET INITIAL RESISTANCE — S310

SET AMPLIFIER GAIN — S320

ADJUST SCALE — S330

COLLECT AND SWITCH SENSING SIGNALS — S340

CONVERT SENSING SIGNAL — S350

AMPLIFY SIGNAL — S360

CONVERT ANALOG SIGNAL TO DIGITAL SIGNAL — S370

GENERATE MOTION SIGNAL — S380

GENERATE COMMAND — S390

TRANSMIT COMMAND — S400

END

MULTI-CHANNEL SOFT-SENSOR-BASED INTERFACE DEVICE, AND OPERATING METHOD

CROSS REFERENCE TO RELATED APPLICATIONS

This is a continuation application of International Patent Application No. PCT/KR2023/003284 filed on Mar. 10, 2023, which claims priority to Korean patent application No. 10-2022-0040549 filed on Mar. 31, 2022 and Korean patent application No. 10-2022-0050187 filed on Apr. 22, 2022, contents of each of which are incorporated herein by reference in their entireties.

BACKGROUND

Technical Field

The present disclosure generally relates to an interface device and an operating method thereof, and more particularly, to a multi-channel soft-sensor-based interface device and an operating method thereof.

Description of Related Technology

In this specification, a "soft sensor" is a sensor with flexibility and elasticity. As a material of a soft sensor, silicon or liquid metal may be used to ensure flexibility and elasticity. Soft sensors are widely used to measure strain, pressure, or the like. For example, a soft sensor may be used to measure the movement of a finger.

SUMMARY

The present disclosure is directed to providing a multi-channel soft-sensor-based interface device into which multi-switching and time-division scheduling are introduced to process multi-sensor data.

The present disclosure is also directed to providing a multi-channel soft-sensor-based interface device to which intelligent sensor measurement preprocessing technology according to sensor characteristics is applied based on a digital variable resistor.

The present disclosure is also directed to providing a method of applying various technologies, such as low-noise amplifying circuit design technology, multi-sensor switching design technology, intelligent sensor measurement preprocessing technology, acceleration sensor measurement and transmission technology, battery management technology, red-green-blue light-emitting diode (RGB LED) control technology, software power control technology, transmission quality assurance technology, module miniaturization design technology, etc., to the interface device in order to increase the mass production of the interface device and reduce power consumption.

Objects of the present disclosure are not limited to the above-described objects and other objects that are not described may be clearly understood by those skilled in the art from the following descriptions.

A multi-channel soft-sensor-based interface device according to one embodiment of the present disclosure to achieve the above purpose is a multi-channel soft-sensor-based interface device in a glove type that recognizes the degree of elasticity of finger joints and includes a sensing module which includes a plurality of strain sensors and collects strain sensing signals of the plurality of strain sensors, a switching unit configured to select any one of the strain sensing signals of the plurality of strain sensors, an amplification module configured to amplify the strain sensing signal selected by the switching unit, and an analog-to-digital (A/D) converter configured to convert the amplified sensing signal into a digital signal.

In one embodiment of the present disclosure, the strain sensors may be mounted on finger joint portions.

In one embodiment of the present disclosure, the interface device may further include a first processor configured to convert the digital signal into a motion signal, and a communication module configured to wirelessly transmit the motion signal to an external device.

In one embodiment of the present disclosure, the interface device may further include a preprocessing module configured to convert the strain sensing signal selected by the switching unit using a first variable resistor, wherein the amplification module may amplify the strain sensing signal that is converted by the preprocessing module.

In one embodiment of the present disclosure, the interface device may further include a preprocessing module configured to adjust a gain of a differential amplifier included in the amplification module using a second variable resistor, wherein the preprocessing module may adjust the gain on the basis of an input voltage range of the A/D converter.

In one embodiment of the present disclosure, the interface device may further include a battery management module configured to control a state of a power source connected to a battery of the interface device so that a charge level of the battery is within a predetermined charge level range.

In one embodiment of the present disclosure, the charge level range may range from 20% to 80%.

Further, an operating method of a multi-channel soft-sensor-based interface device according to one embodiment of the present disclosure includes a sensing signal collection and switching operation of collecting strain sensing signals of a plurality of strain sensors and selecting any one of the strain sensing signals of the plurality of strain sensors, a signal amplification operation of amplifying the selected strain sensing signal, and an analog-to-digital conversion operation of converting the amplified sensing signal into a digital signal.

In one embodiment of the present disclosure, the operating method of the multi-channel soft-sensor-based interface device may further include, after the sensing signal collection and switching operation, converting the selected strain sensing signal using a first variable resistor.

In one embodiment of the present disclosure, the operating method of the multi-channel soft-sensor-based interface device may further include an initial resistance setting operation of setting a resistance value of the first variable resistor for each strain sensor on the basis of a resistance change range of the plurality of strain sensors, and an amplifier gain setting operation of setting a gain of a differential amplifier used in the signal amplification operation on the basis of an input voltage range of an A/D converter.

In one embodiment of the present disclosure, in the initial resistance setting operation, the resistance value may be set based on a maximum measurement value of each strain sensor.

In one embodiment of the present disclosure, in the amplifier gain setting operation, the input voltage range of the A/D converter may be adjusted within an input range of the differential amplifier.

In one embodiment of the present disclosure, the operating method of the multi-channel soft-sensor-based interface device may further include storing the resistance value and the gain of the differential amplifier in a built-in memory.

In one embodiment of the present disclosure, the operating method of the multi-channel soft-sensor-based interface device may further include an initial resistance setting operation of setting the resistance value of the first variable resistor to a maximum measurement range of each strain sensor on the basis of the resistance change range of the plurality of strain sensors, and an amplifier gain setting operation of setting the gain of the differential amplifier used in the signal amplification operation for adjusting the input voltage range of the A/D converter to be within the input range of the differential amplifier.

According to one embodiment of the present disclosure, it is possible to increase the accuracy of a sensor measurement value and improve the reliability of a soft sensor-based interface device by automatically calibrating a sensor mounted on the soft sensor-based interface device and automatically controlling a gain of a differential amplifier on the basis of a digital variable resistor, and it is possible to increase the mass production of the interface device because manual calibration work for a plurality of sensors can be excluded.

Further, according to one embodiment of the present disclosure, it is possible to reduce the number of amplifiers mounted on the interface device and power usage by introducing multi-switching and time-division scheduling to process multi-sensor data.

Further, according to one embodiment of the present disclosure, it is possible to extend the lifetime of the battery built into the interface device by preventing overcharging and overdischarging of a battery.

Effects obtainable in the present disclosure are not limited to the above-described effects and other effects that are not described may be clearly understood by those skilled in the art from the following description.

BRIEF DESCRIPTION OF THE DRAWINGS

FIG. 1 is a diagram of an example of a low-current/low-noise amplifying circuit included in a multi-channel soft-sensor-based interface device according to one embodiment of the present disclosure.

FIG. 2 is a diagram of an example of a multi-sensor measurement switching circuit included in the multi-channel soft-sensor-based interface device according to one embodiment of the present disclosure.

FIG. 4B is a diagram of an example of a digital variable resistor control circuit for initializing a sensor resistance value that is included in the multi-channel soft-sensor-based interface device according to one embodiment of the present disclosure.

FIG. 5 is a diagram of an example of the control of a gain of a digital variable resistor-based differential amplifier included in the multi-channel soft-sensor-based interface device according to one embodiment of the present disclosure.

FIG. 12 is a diagram of an example of an overcharge and overdischarge prevention circuit included in the multi-channel soft-sensor-based interface device according to one embodiment of the present disclosure.

FIG. 15 is a block diagram illustrating a configuration of the multi-channel soft-sensor-based interface device according to one embodiment of the present disclosure.

FIG. 16 is a flowchart for describing an operating method of the multi-channel soft-sensor-based interface device according to one embodiment of the present disclosure.

DETAILED DESCRIPTION

Figure 3:
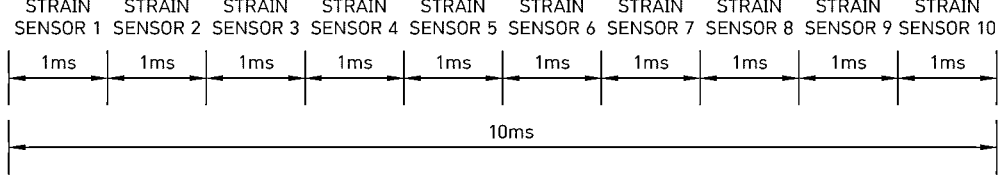
FIG. 3 is a diagram of an example of time-division measurement for multiple sensors of the multi-channel soft-sensor-based interface device according to one embodiment of the present disclosure.

Recently, interface devices for virtual reality (VR), augmented reality (AR), or mixed reality (MR) have been developed based on soft sensors. For example, a glove-type soft-sensor-based interface may generate input signals by measuring the movement of finger joints or the grip pressure of fingertips in real time with 10 built-in soft sensors and transmit the generated input signals to an external device, and may convert signals received from the external device into a sense of touch or force through a built-in haptic device (e.g., a vibration motor) and transmit the converted sense of touch or force to a user.

Soft-sensor-based interfaces are increasingly being used in various fields, including military, rehabilitation, broadcasting, gaming, etc. For example, the interfaces are being used in VR training for soldiers or patients, live broadcasting of animations that require real-time motion capture technology, VR games that allow the use of gloves instead of controllers, etc.

However, although various products such as finger movement measuring gloves and the like are being released for soft-sensor-based interfaces, various problems such as difficulty in accurate measurement due to the limitations of sensors themselves built into interface devices, vulnerability to moisture or magnetic fields, accumulated errors occurring over time, reduced wearing comfort due to the size of an electrical part (e.g., a printed circuit board (PCB)), low mass production due to manual work such as sensor calibration, amplification ratio adjustment, etc., limited expansion of the demand base due to high price, etc. are emerging, and thus it is necessary to develop diverse technologies to solve the above problems.

Advantages and features of the present disclosure and methods of achieving the same will be clearly understood with reference to the accompanying drawings and embodiments described in detail below. However, the present disclosure is not limited to the embodiments to be disclosed below but may be implemented in various different forms. The embodiments are provided in order to fully explain the present embodiments and fully explain the scope of the present disclosure for those skilled in the art. The scope of the present disclosure is only defined by the appended claims. Meanwhile, the terms used herein are provided only to describe the embodiments of the present disclosure and not for purposes of limitation. In this specification, the singular forms include the plural forms unless the context clearly indicates otherwise. It will be understood that the terms "comprise" and/or "comprising" used herein specify some stated components, steps, operations and/or elements but do not preclude the presence or addition of one or more other components, steps, operations and/or elements.

In description of the present disclosure, detailed descriptions of related known configurations or functions that are deemed to unnecessarily obscure the gist of the present disclosure will be omitted.

Hereinafter, embodiments of the invention will be described in detail with reference to the accompanying drawings. In description of the invention, in order to facilitate overall understanding, like reference numerals are used for like elements throughout the drawings.

Hereinafter, a technology applied to a soft-sensor-based interface device according to one embodiment of the present disclosure will be described. For convenience of description, the present embodiment will focus on a glove-type soft-sensor-based interface device in which a strain sensor is mounted on each finger portion and one acceleration sensor is mounted. That is, the soft-sensor-based interface device according to one embodiment of the present disclosure is for a case in which the soft-sensor-based interface device has 10 or more strain sensors and one acceleration sensor. However, the scope of the present disclosure is not limited thereto. For example, 10 strain sensors may be mounted in the interface device without an acceleration sensor.

Figure 1:
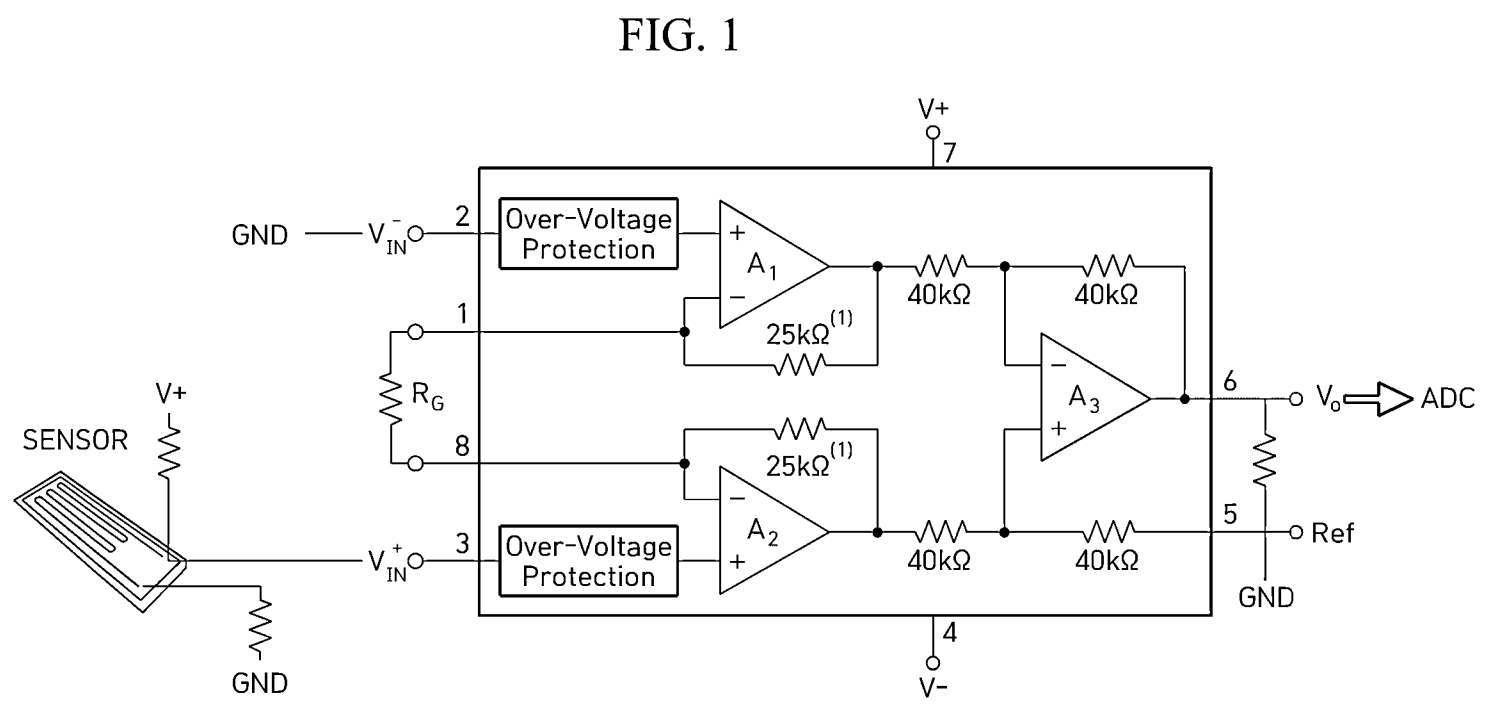

FIG. 1 is a diagram of an example of a low-current/low-noise amplifying circuit included in a multi-channel soft-sensor-based interface device according to one embodiment of the present disclosure. Since a change in resistance of a strain sensor is usually very small, amplification through an amplifying circuit is required. A low-current/low-noise amplifying circuit suitable for a low-resistance strain sensor may be formed using a differential amplifier, as illustrated in the example of FIG. 1. The amplifying circuit according to the example of FIG. 1 includes three differential amplifiers $A_1$, $A_2$, and $A_3$. An output of the sensor is connected to a non-inverting terminal (+) of a second differential amplifier $A_2$ via an over-voltage protection (OVP) circuit, and the ground is connected to a non-inverting terminal (+) of a first differential amplifier $A_1$ via an OVP circuit. In addition, an output terminal of the first differential amplifier $A_1$ is connected to an inverting terminal (−) and output terminal of a third differential amplifier $A_3$ via a resistor, and an output terminal of the second differential amplifier $A_2$ is connected to a non-inverting terminal (+) of the third differential amplifier $A_3$ via a resistor. An output of the third differential amplifier $A_3$ is transmitted to an analog-to-digital (A/D) converter (ADC).

Figure 2:
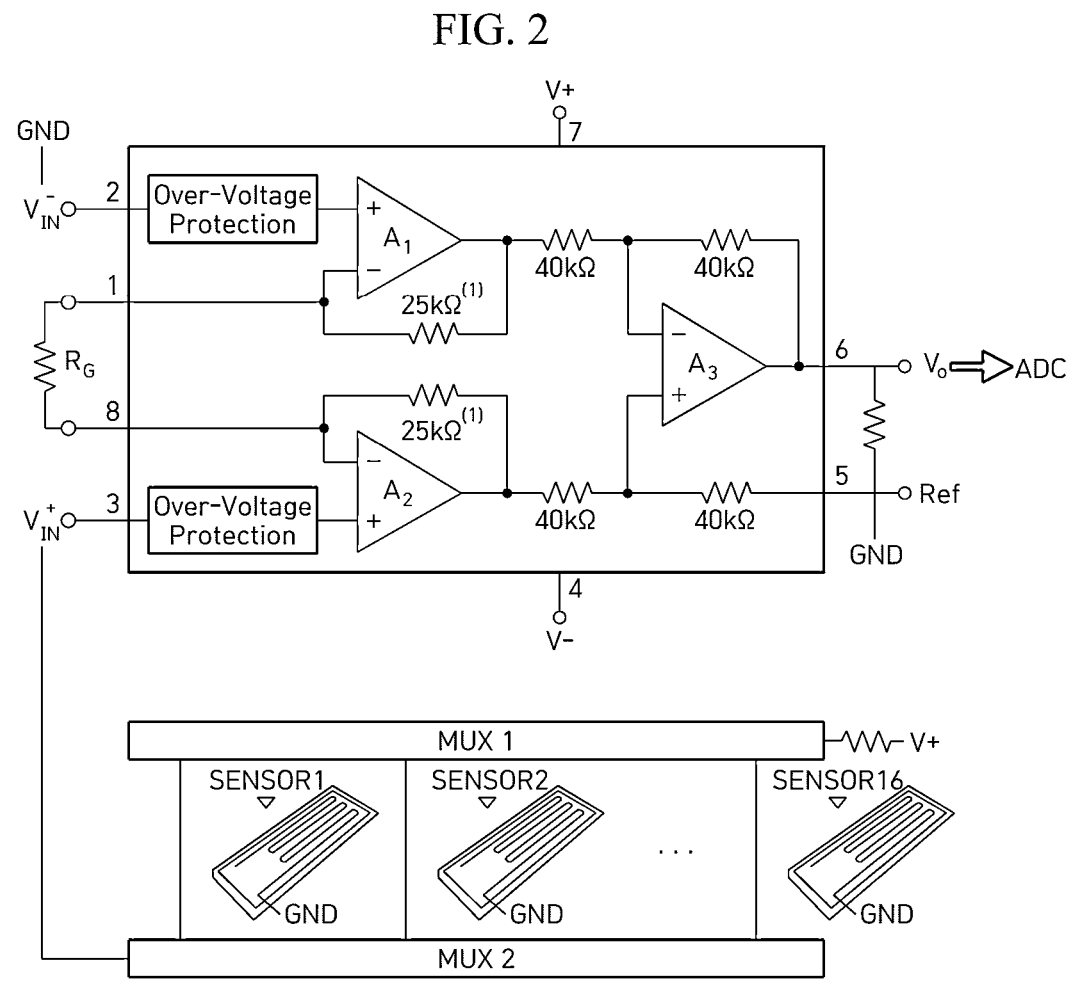

FIG. 2 is a diagram of an example of a multi-sensor measurement switching circuit included in the multi-channel soft-sensor-based interface device according to one embodiment of the present disclosure. The switching circuit is intended to miniaturize the amplifier portion included in the interface device, and is an example in which a switching circuit is formed using a multiplexer (MUX) to allow one amplifier to amplify signals of multiple sensors, e.g., 10 or more sensors. That is, the multi-channel soft-sensor-based interface device according to one embodiment of the present disclosure is formed so that, instead of providing individual amplification modules (amplifying circuits) for each sensor, a single amplification module (amplifying circuit) can use a switching circuit to amplify measurement signals generated by all the sensors.

FIG. 3 is a diagram of an example of time-division measurement for the multiple sensors of the multi-channel soft-sensor-based interface device according to one embodiment of the present disclosure. MUX control firmware performs time-division measurement on signals of the multiple sensors. As illustrated in FIG. 3, the time-division measurement may be performed by measuring signals (strain sensing signals) of 10 strain sensors in units of time divided into 1 ms each for 10 ms.

Figure 4A:
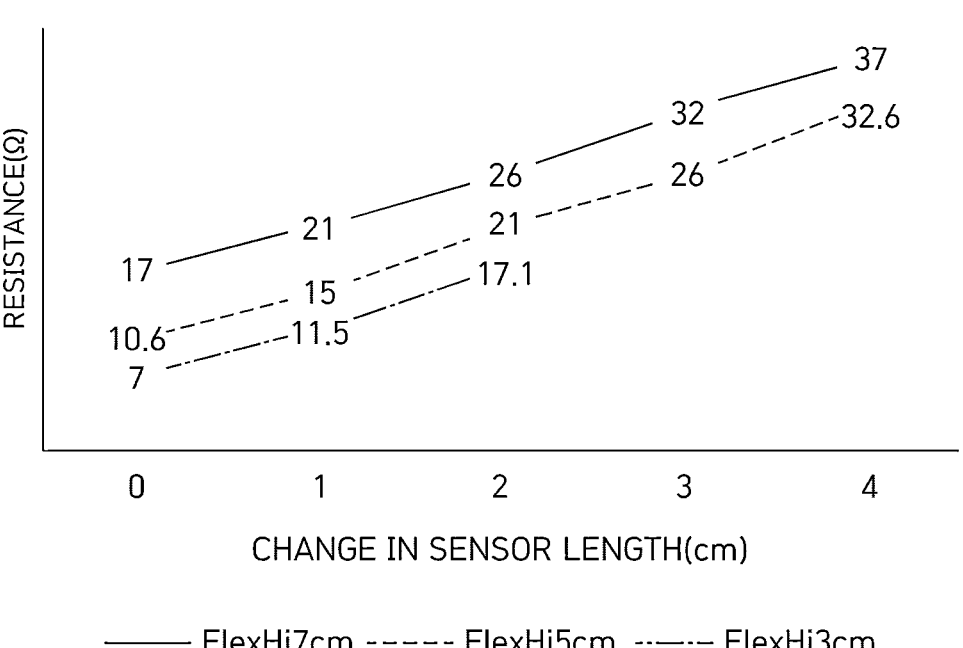
FIG. 4A is a diagram showing a change in resistance according to a change in sensor length.
Figure 4B:
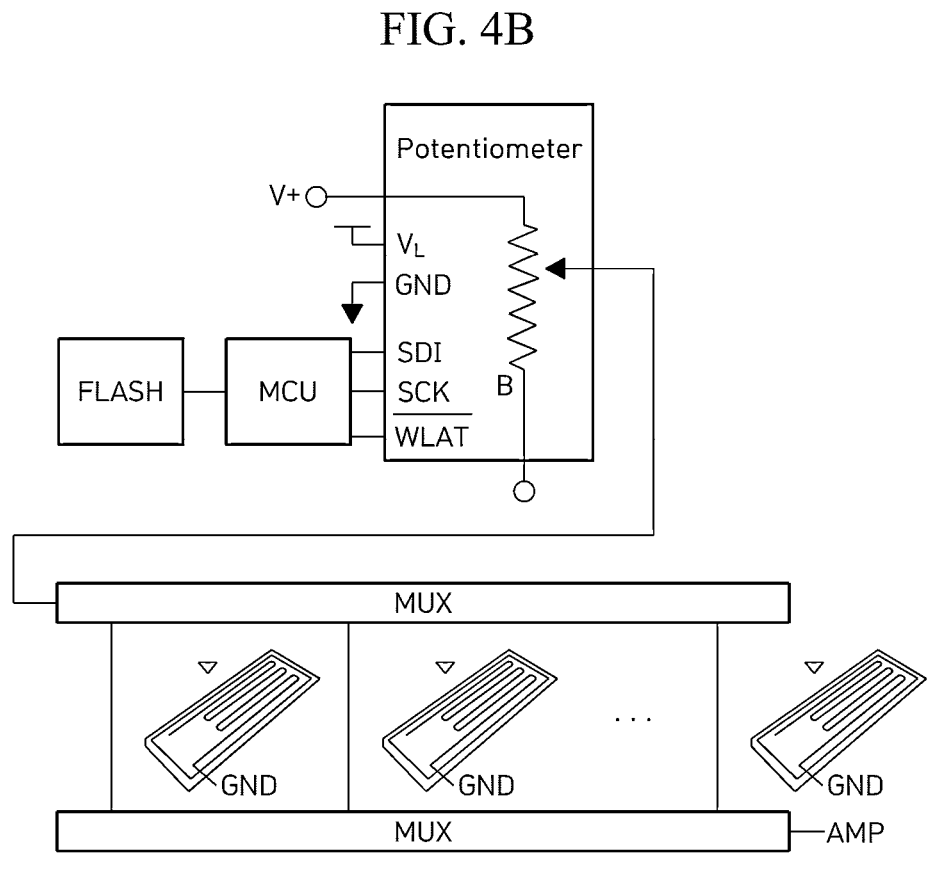

FIGS. 4 (FIGS. 4A and 4B) to 8 are diagrams of an intelligent sensor measurement preprocessing technology applied to the multi-channel soft-sensor-based interface device according to one embodiment of the present disclosure. The sensor measurement preprocessing procedure technology applied to the interface device may include (1) setting of the initial resistance, (2) control of the amplifier gain, (3) adjustment of the scale, and (4) storage of the initial resistance value and amplifier gain value.

FIG. 4A is a diagram showing a change in resistance according to a change in sensor length, and FIG. 4B is a diagram of an example of a digital variable resistor control circuit for initializing a sensor resistance value (setting of the initial resistance) that is included in the multi-channel soft-sensor-based interface device according to one embodiment of the present disclosure. The sensors included in the interface device may have different characteristics depending on differences in materials or physical properties, even when the sensors are designed with the same specifications. For example, even when a plurality of strain sensors included in the interface device are designed with the same resistance value, the plurality of strain sensors may have a resistance value different from a designed resistance value after being manufactured, and the respective strain sensors may have different resistance values. Therefore, it is necessary to calibrate these differences using a digital variable resistor.

Figure 5:
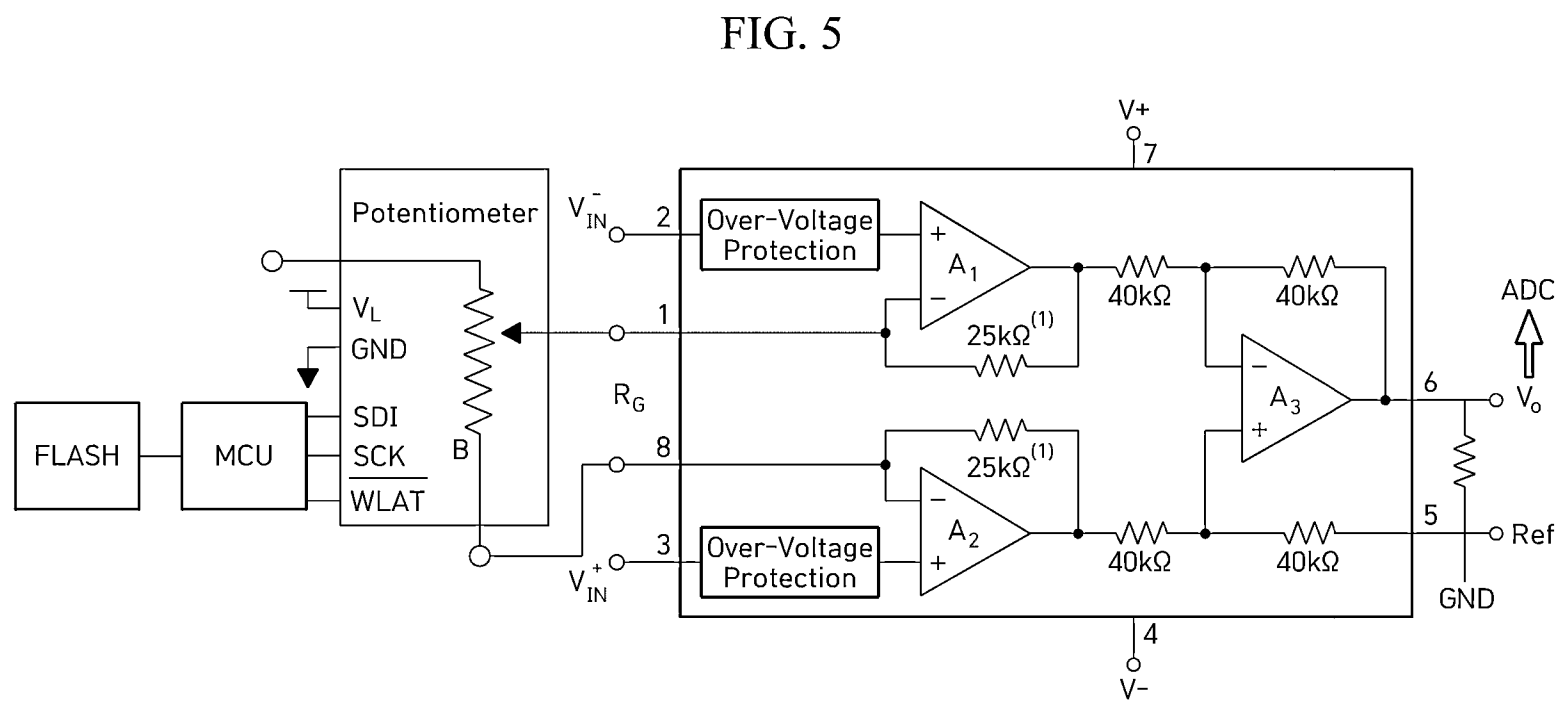

Meanwhile, in addition to the setting of the initial resistance, control of the amplifier gain is also necessary to improve measurement precision. FIG. 5 is a diagram of an example of the control of a gain of a digital variable resistor-based differential amplifier included in the multi-channel soft-sensor-based interface device according to one embodiment of the present disclosure. A differential amplifier gain control circuit based on a digital variable resistor according to the present disclosure may be formed by connecting a variable resistor (potentiometer) to an inverting terminal (−) of the first differential amplifier $A_1$ and an inverting terminal (−) of the second differential amplifier $A_2$ in the amplifying circuit illustrated in FIG. 1, as illustrated in FIG. 5.

Figure 6:
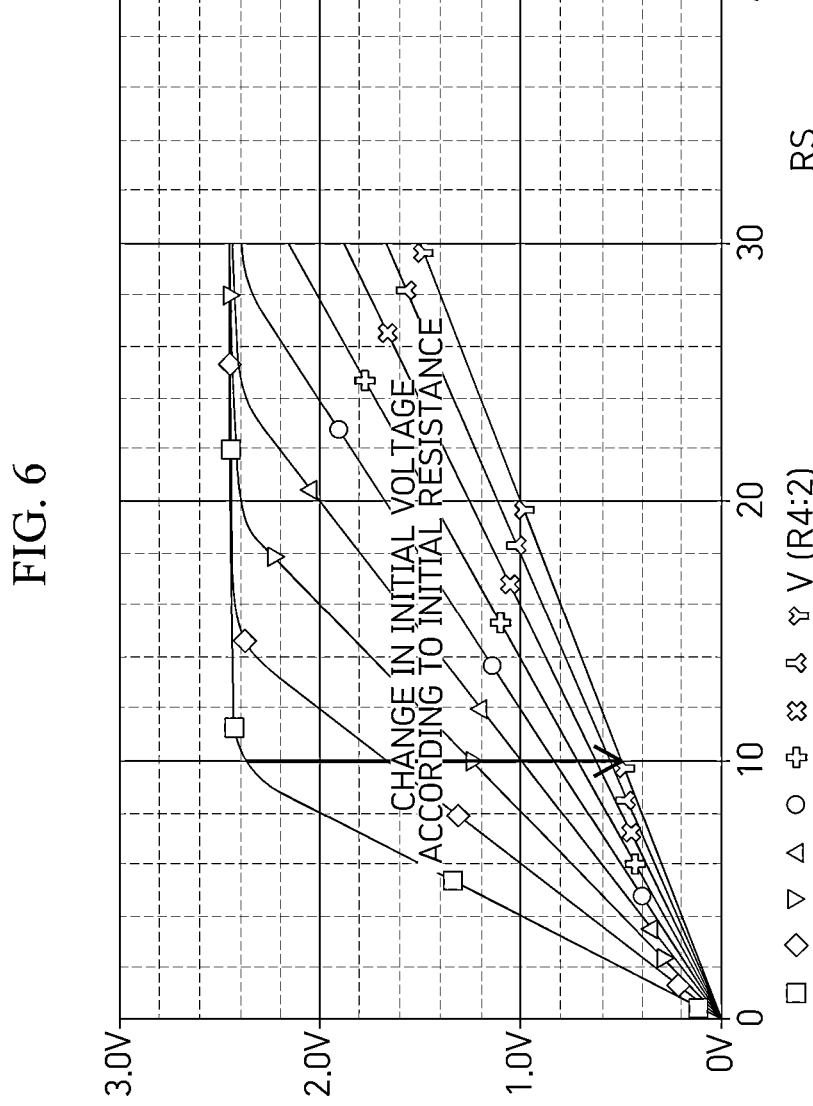
FIG. 6 is a diagram showing examples of a change in voltage according to a digital variable resistor.
Figure 7:
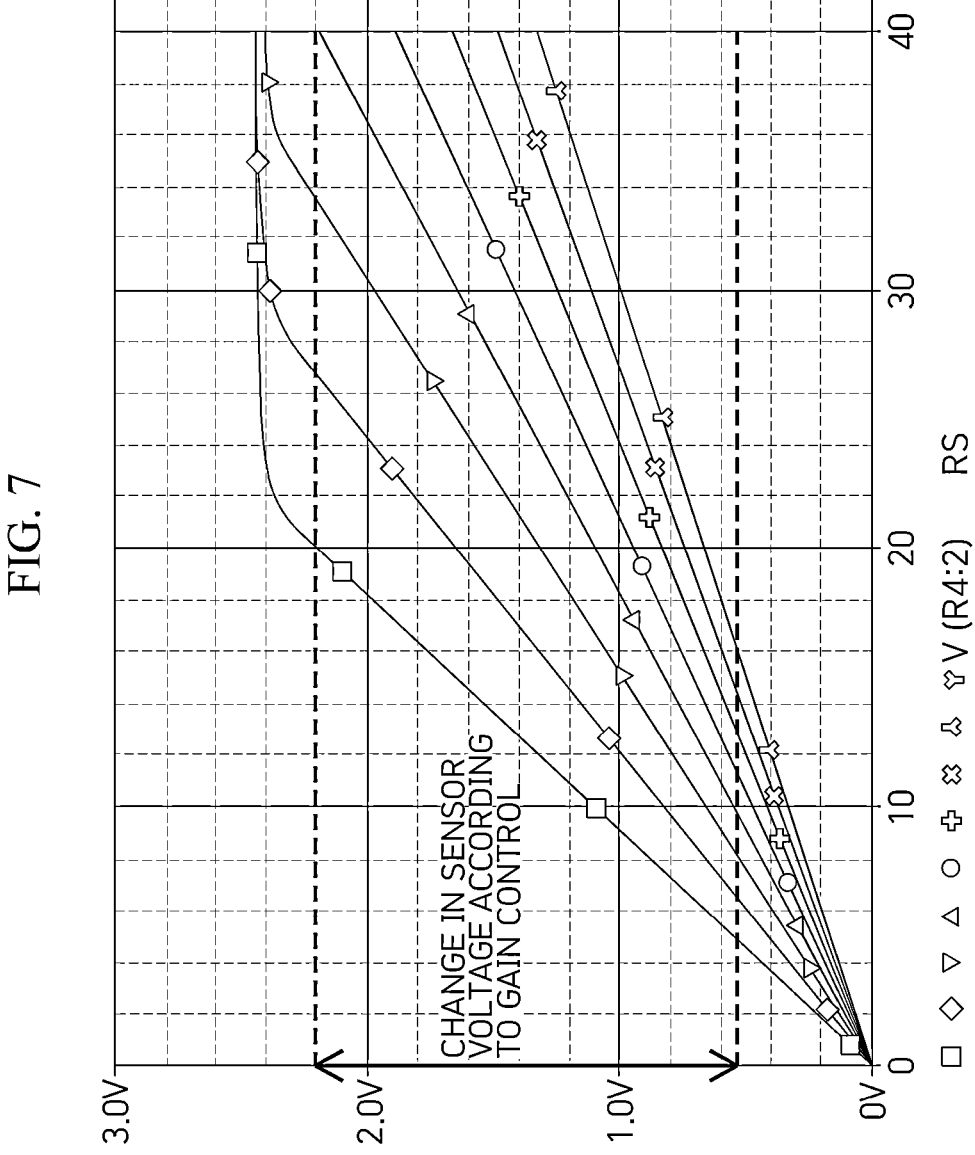
FIG. 7 is a diagram of an example of the control of a gain of an amplifier according to a sensor.

In the interface device, a preprocessing module, which performs tasks of (1) setting of the initial resistance, (2)

control of the amplifier gain, (3) adjustment of the scale, and (4) storage of the initial resistance value and amplifier gain value, has built-in firmware that performs intelligent sensor measurement preprocessing according to sensor characteristics and a resistance change range. For example, the firmware performs a function of controlling an initial digital variable resistor. That is, the firmware performs an operation of controlling the initial digital variable resistor according to the sensor characteristics and controlling consumption current according to the variable resistor. FIG. 6 is a diagram showing examples of a change in voltage according to the digital variable resistor, and it can be seen that the initial voltage changes according to the initial resistance. Further, the firmware controls a gain of a differential amplifier according to the sensor resistance change range, adjusts a micro voltage measurement range according to the control of the gain of the differential amplifier, and stores the initial resistance value and the amplifier gain value in a nonvolatile memory for future repeated use. FIG. 7 is a diagram of an example of the control of a gain of an amplifier according to a sensor, and shows a change in voltage of the sensor according to gain control. The function of the firmware described above may be performed by a plurality of pieces of firmware that are responsible for each detailed function.

Figure 8:
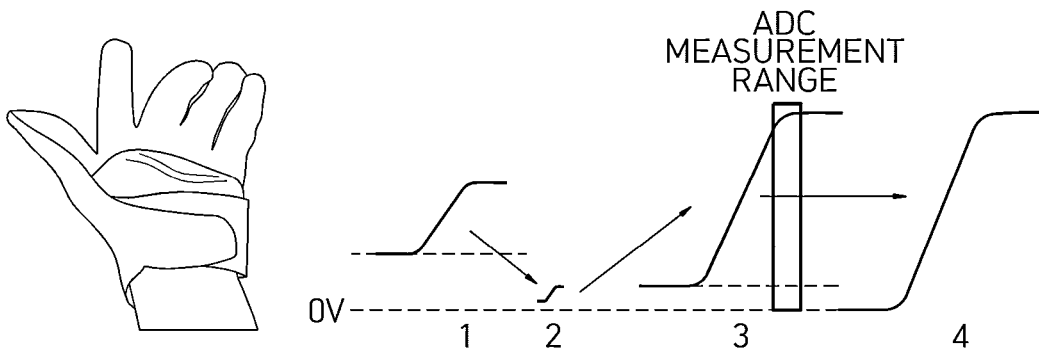
FIG. 8 is a diagram showing an initial resistance and gain control procedure applied to the multi-channel soft-sensor-based interface device according to one embodiment of the present disclosure.

FIG. 8 is a diagram showing an initial resistance and gain control procedure applied to the multi-channel soft-sensor-based interface device according to one embodiment of the present disclosure. As described above, assuming a glove-type soft-sensor-based interface device, a user may change the resistance of a strain sensor by repeatedly performing first clenching and unclenching motions in a calibration mode while wearing the interface device. In this case, 1) a voltage changes according to a change in resistance of the strain sensor. That is, the preprocessing module may measure the change in resistance according to the user's motion on the basis of a measured voltage value. 2) In order to improve precision, an initial resistance should be set, and a voltage range may vary depending on the setting of the initial resistance. The preprocessing module may set the initial resistance so that the voltage range is formed according to a predetermined reference. 3) When a sensing signal passes through an amplifying circuit, a voltage increases, and the preprocessing module controls a gain of an amplifier to adjust the voltage that appears as a result of the amplification. The preprocessing module controls the gain of the amplifier on the basis of a measurement range of an ADC to adjust the change in voltage. That is, the preprocessing module may set the gain of the amplifier on the basis of the measurement range of the ADC. 4) Additionally, the preprocessing module may adjust a scale for a data value. That is, the preprocessing module may adjust a zero point and a scale for the amplified measurement value so that the measurement value with the adjusted zero point and scale is transmitted to the ADC. The above-described zero point and scale adjustment may be performed in a software manner.

Figure 9:
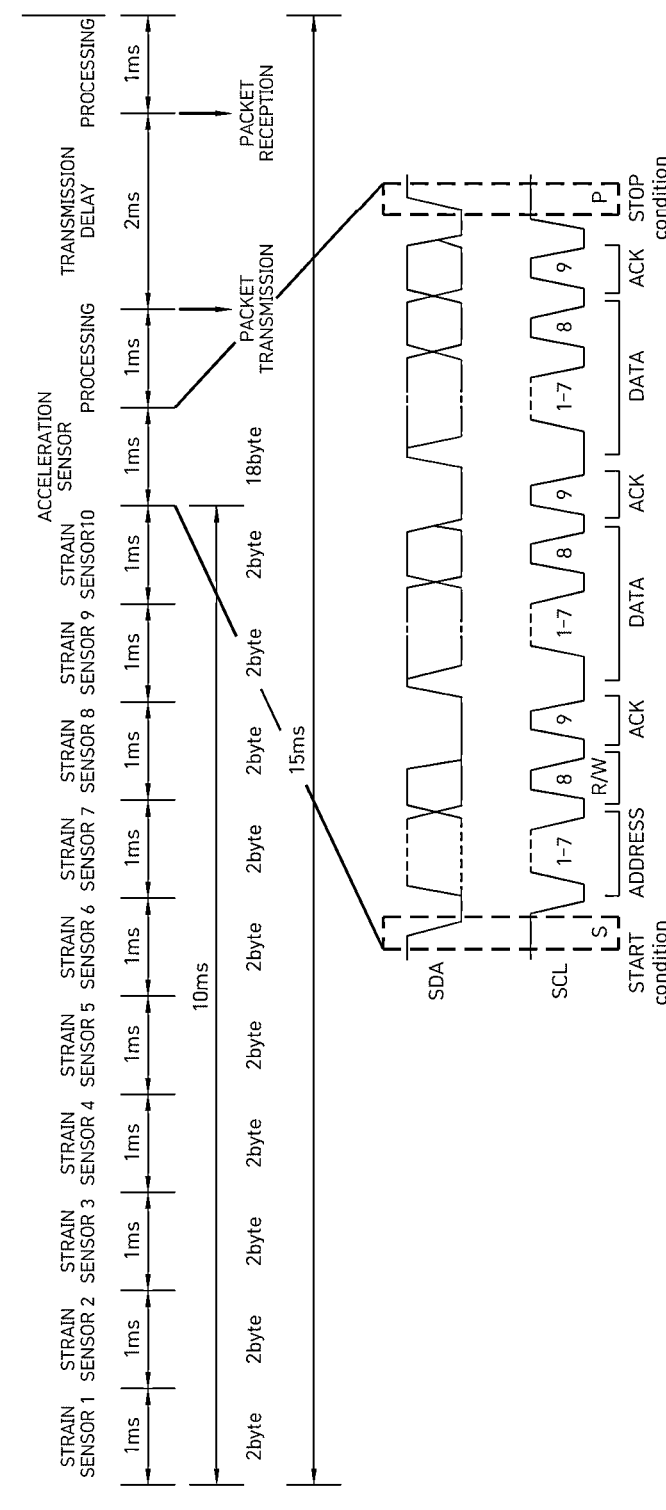
FIG. 9 is a timing diagram for measurement and transmission of an acceleration sensor of the multi-channel soft-sensor-based interface device according to one embodiment of the present disclosure.

FIG. 9 is a timing diagram for measurement and transmission of an acceleration sensor of the multi-channel soft-sensor-based interface device according to one embodiment of the present disclosure. The multi-channel soft-sensor-based interface device according to one embodiment of the present disclosure may further include an acceleration sensor in addition to the strain sensor. When an acceleration sensor is mounted on the interface device, an acceleration sensor interface and measurement data transmission technology is required. Specifically, the interface device may include an acceleration sensor interface circuit and may have built-in firmware that is in charge of scheduling for ensuring transmission quality of measurement data of the acceleration sensor. As illustrated in FIG. 9, assuming a sensor data processing cycle of 15 ms, it is possible to perform scheduling in such a way that acceleration sensor measurement values are processed within 1 ms immediately after processing measurement values of strain sensors (e.g., 10 strain sensors) for 10 ms.

Figure 10:
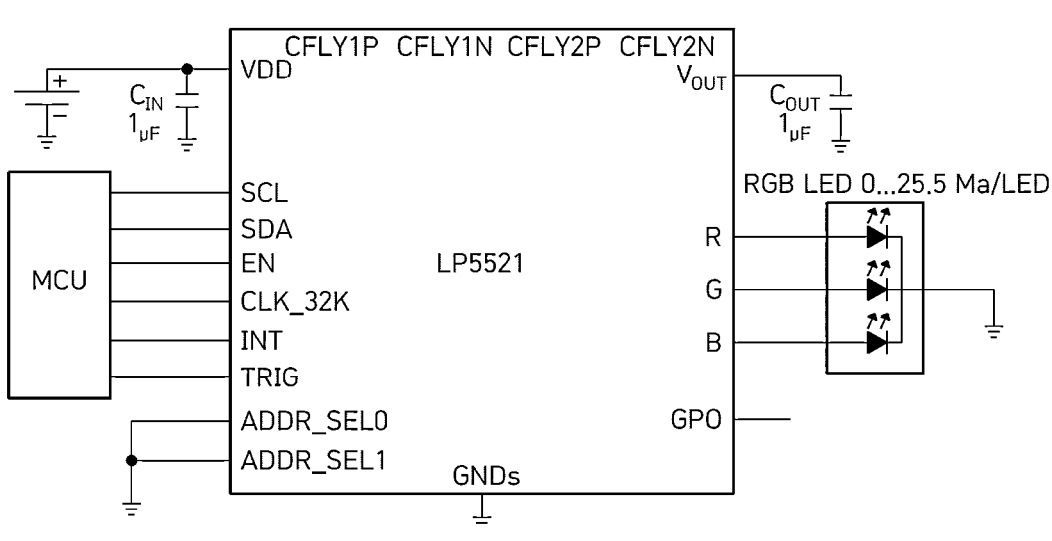
FIG. 10 is a diagram of a red-green-blue light-emitting diode (RGB LED) drive circuit included in the multi-channel soft-sensor-based interface device according to one embodiment of the present disclosure, and a control method thereof.
Figure 10:
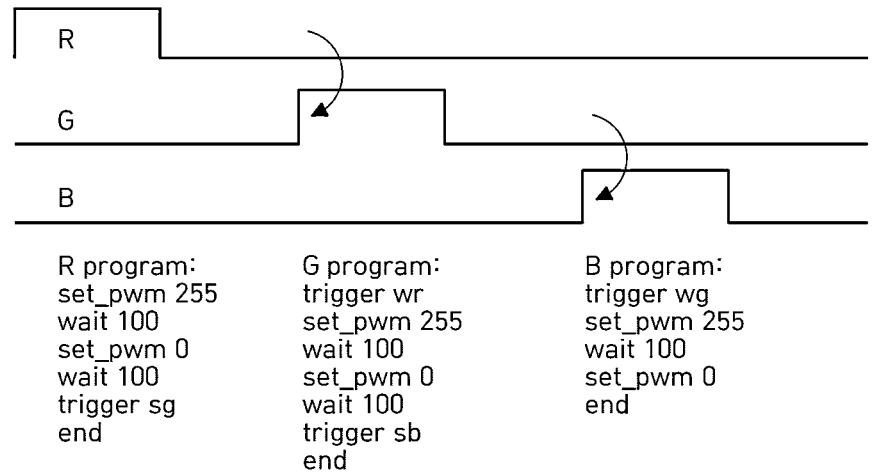

FIG. 10 is a diagram of a red-green-blue light-emitting diode (RGB LED) drive circuit included in the multi-channel soft-sensor-based interface device according to one embodiment of the present disclosure, and a control method thereof. The interface device may include an RGB LED display for monitoring a state of a device. In this case, the interface device may have a built-in RGB LED control circuit, and built-in firmware for controlling an LED.

Figure 11:
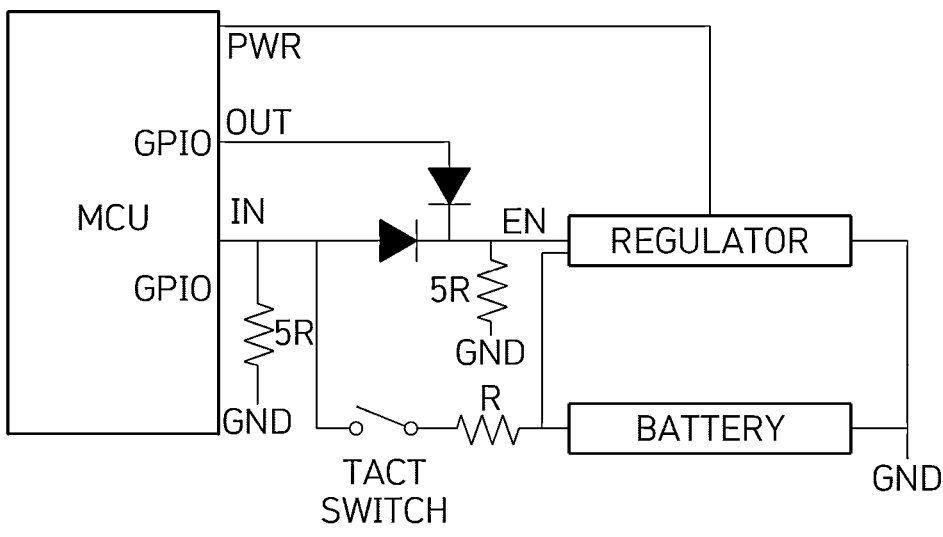
FIG. 11 is a diagram illustrating a software power control structure of the multi-channel soft-sensor-based interface device according to one embodiment of the present disclosure.

FIG. 11 is a diagram illustrating a software power control structure of the multi-channel soft-sensor-based interface device according to one embodiment of the present disclosure. The interface device may be equipped with a power on/off function using a tact switch. In this case, the interface device may have a built-in power control circuit via a tact switch, and built-in firmware for controlling the tact switch. An example of a process in which power is turned on or off through a tact switch is as follows.

1) Tact switch closed→Power on
2) Power on→General-purpose input/output (GPIO) out high
3) GPIO out high→Keep power on
4) (For a time longer than or equal to a threshold time) tact switch closed→GPIO out low
5) GPIO out low & tact switch open→Power off When the tact switch is pressed (closed), the power changes to an on state, and the GPIO out of a micro controller unit (MCU) becomes high. In this case, the power is maintained regardless of whether the tact switch is in the closed state or open state. Thereafter, when the tact switch is continuously pressed (closed) for a time longer than or equal to the threshold time (e.g. 3 seconds), the GPIO out becomes low, and when the tact switch changes from the closed state to the open state, the power is turned off.

Figure 12:
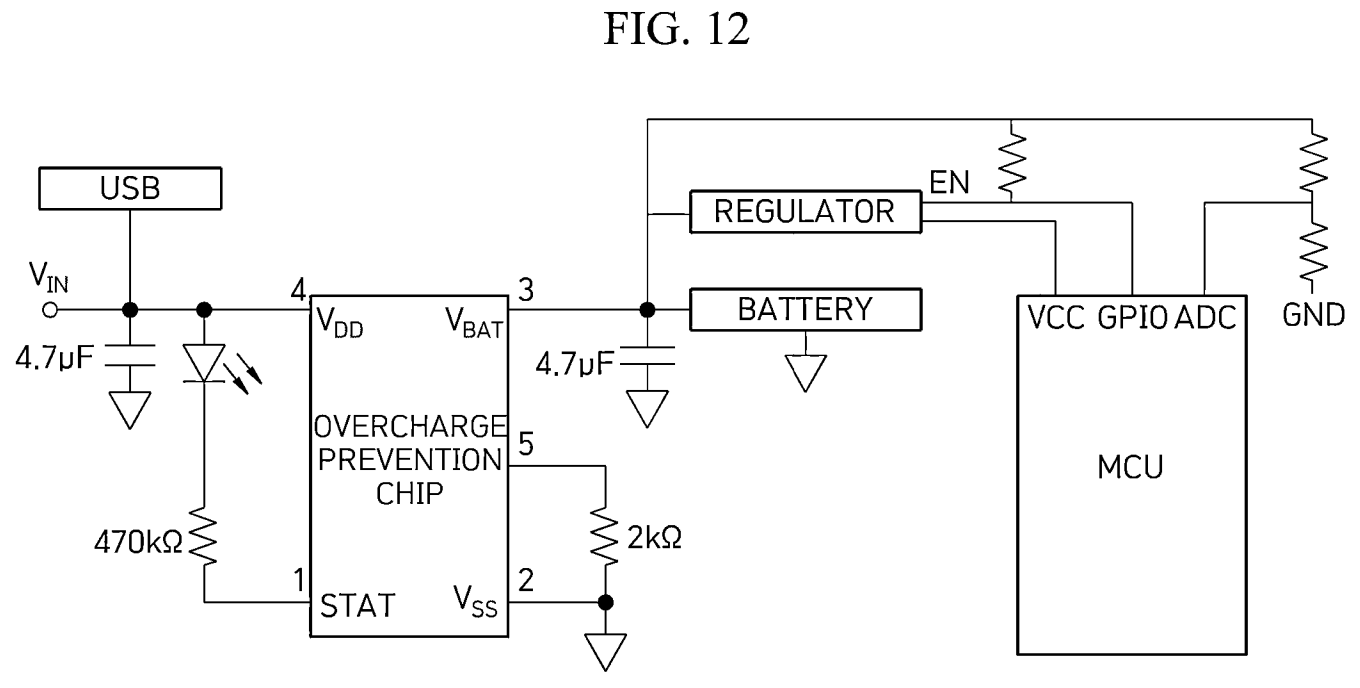

FIG. 12 is a diagram of an example of an overcharge and overdischarge prevention circuit included in the multi-channel soft-sensor-based interface device according to one embodiment of the present disclosure. A battery management module of the interface device may include an overcharge and overdischarge prevention circuit. The overcharge and overdischarge prevention circuit may include an overcharge prevention chip. Assuming that the interface device is equipped with a lithium ion battery, the battery management module of the interface device may include a circuit and software (firmware) that prevent overcharge and overdischarge of the lithium ion battery. The battery management module may further include a tact switch, and as illustrated in FIG. 11, by performing power on/off control using the tact switch, power may be cut off when the battery has a first critical capacity (e.g., 20%) or less, and charging may be cut off when the battery has a second critical capacity (e.g., 80%) or more. By managing the battery capacity within a predetermined charge range (a range between the first critical capacity and the second critical capacity), it is possible to extend the battery usage time as much as possible.

Figure 13:
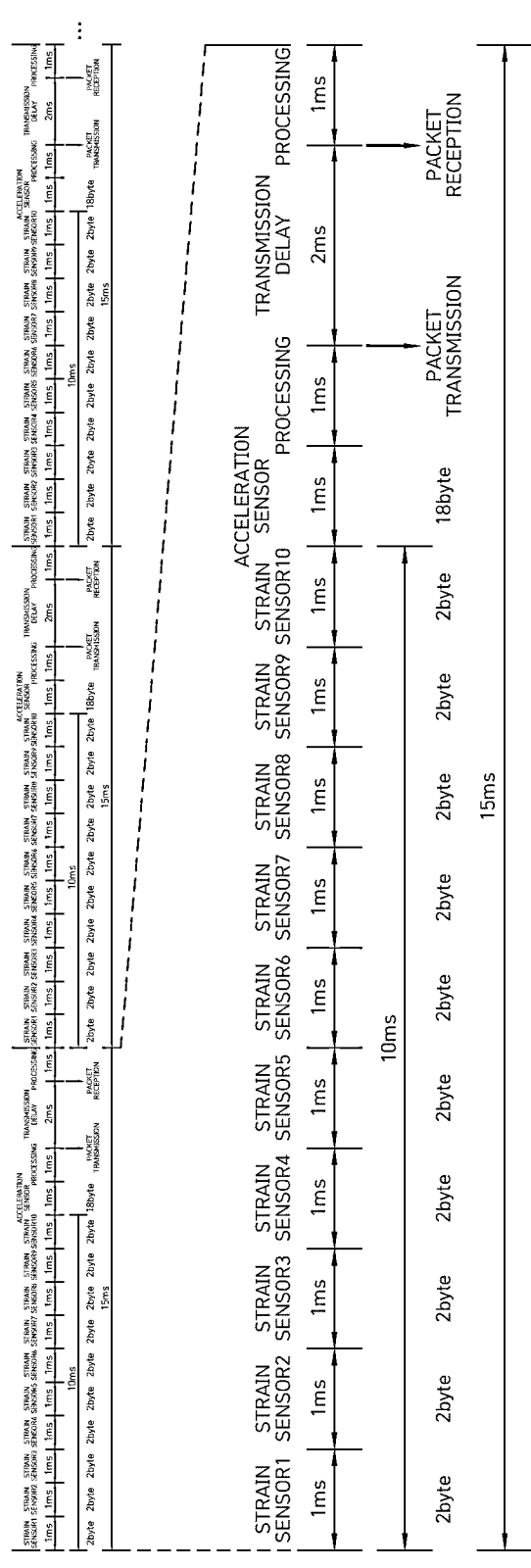
FIG. 13 is a timing diagram for measurement and wireless transmission of sensor values applied to the multi-channel soft-sensor-based interface device according to one embodiment of the present disclosure.

FIG. 13 is a timing diagram for measurement and wireless transmission of sensor values applied to the multi-channel soft-sensor-based interface device according to one embodiment of the present disclosure. The interface device wirelessly transmits a strain sensor value and an acceleration sensor value to an external device or server through a communication module, and a scheduled communication protocol is required to ensure quality of service (QOS) of sensor value data transmission. That is, the interface device performs multi-sensor data measurement and wireless transmission using a scheduling algorithm. The communication module of the interface device may include a Bluetooth interface for wireless data transmission. Further, data frames and protocols for wireless data transmission may be defined.

Figure 14A:
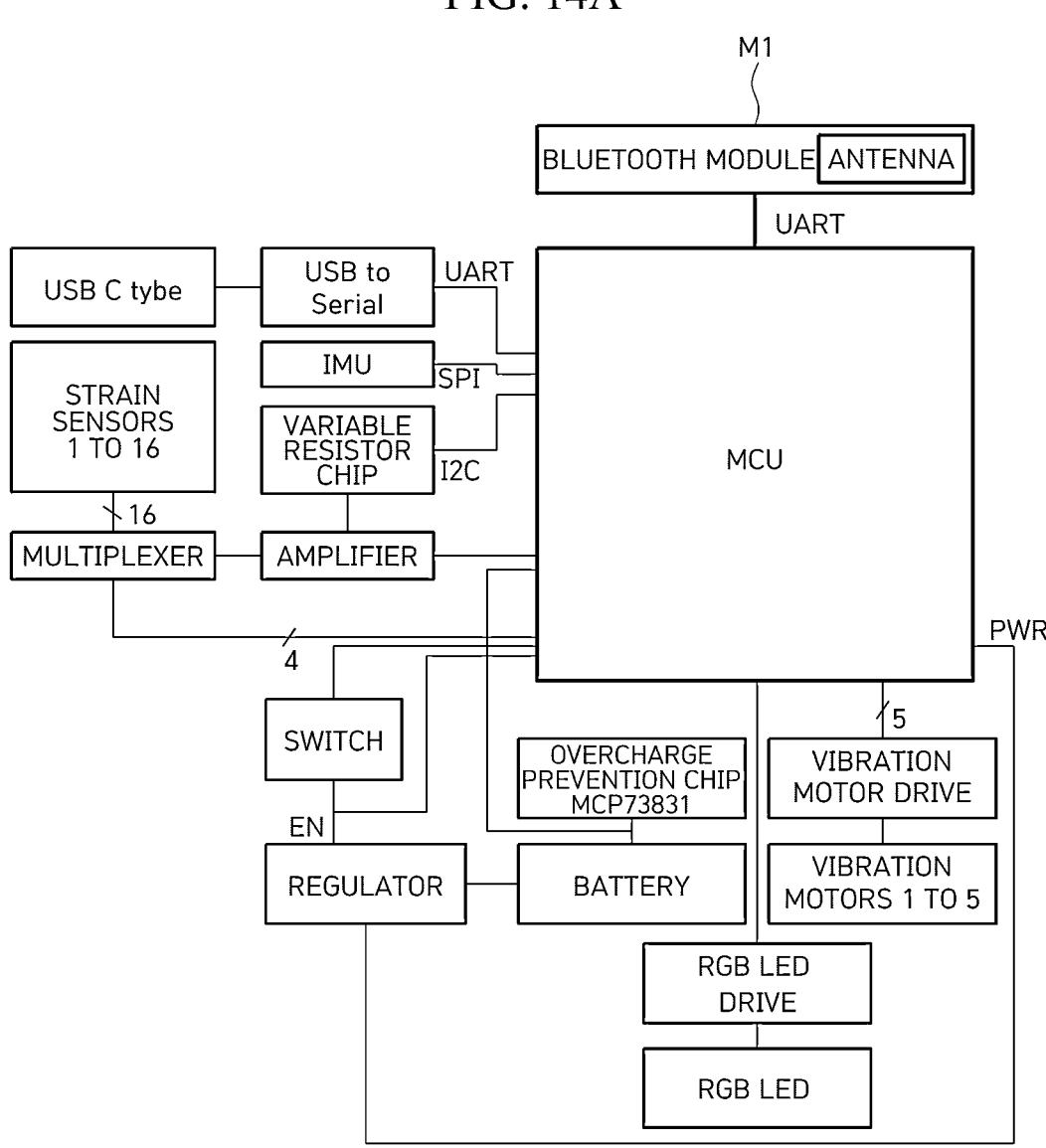
FIGS. 14A to 14C are diagrams illustrating a multi-sensor and data wireless transmission module (communication module) that are included in the multi-channel soft-sensor-based interface device according to one embodiment of the present disclosure.
Figure 14B:
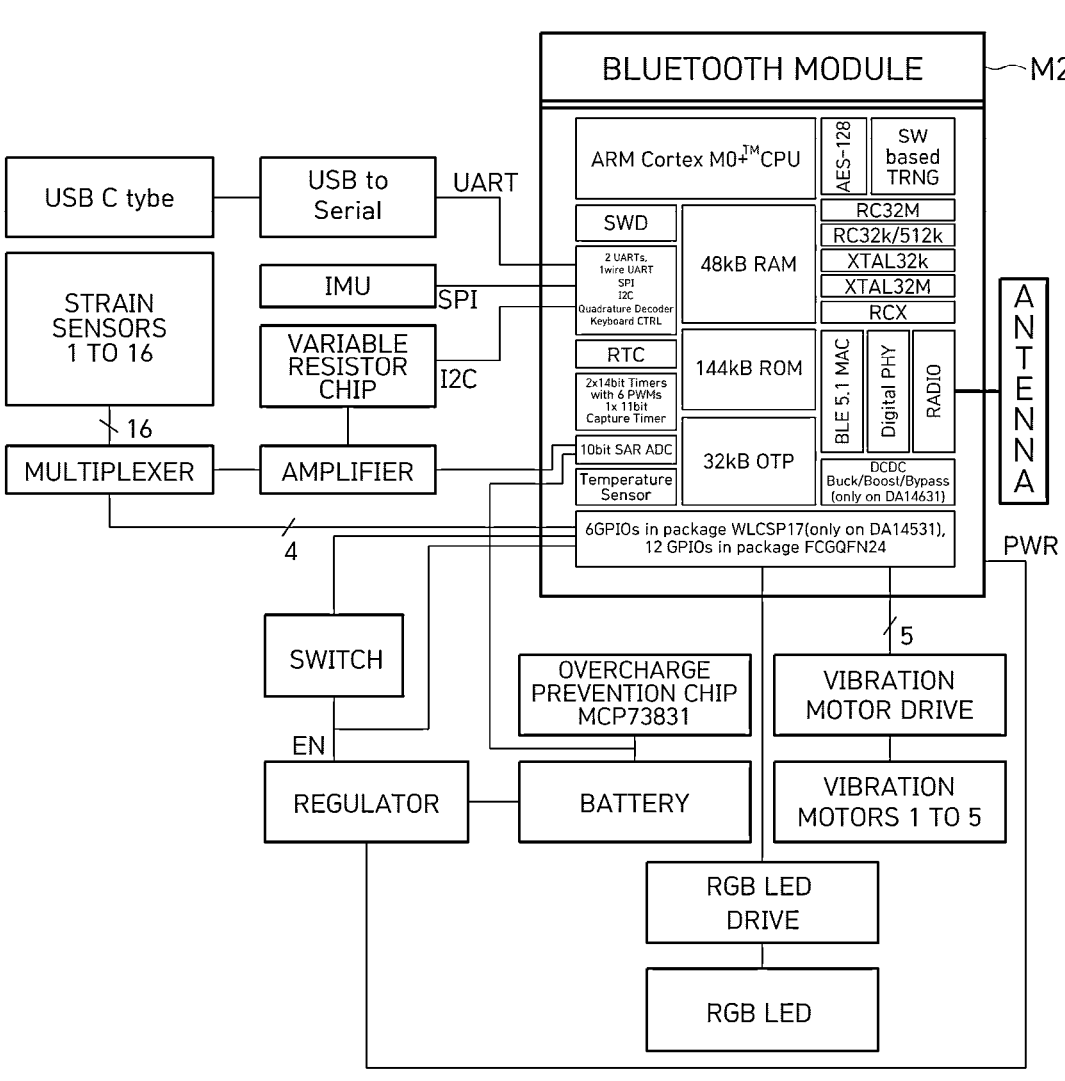
Figure 14C:
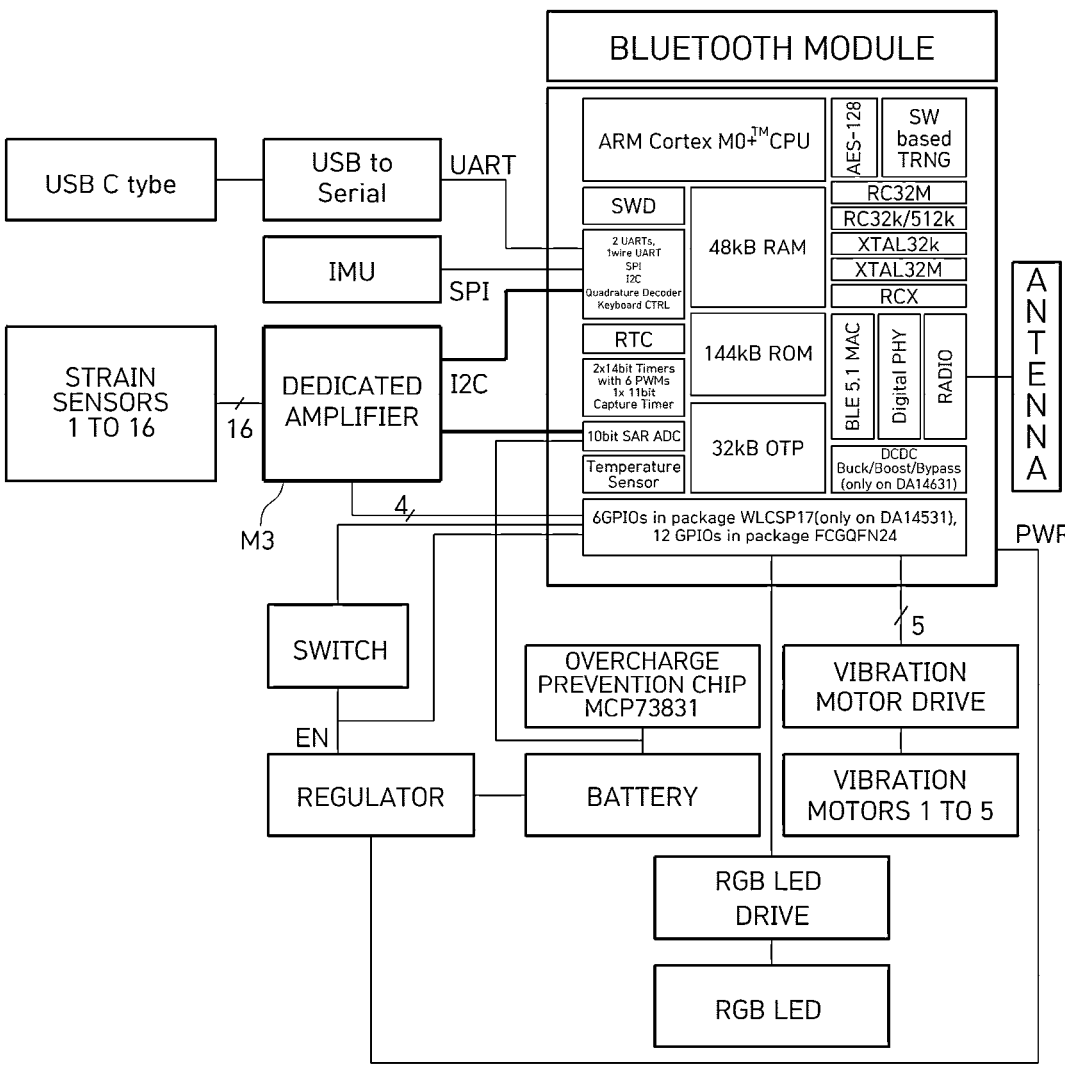

FIGS. 14A to 14C are diagrams illustrating a multi-sensor and data wireless transmission module (communication module) that are included in the multi-channel soft-sensor-based interface device according to one embodiment of the present disclosure. The communication module wirelessly transmits data of multiple strain sensors (10 or more strain sensors) and an acceleration sensor to an external device or server. The interface device may be equipped with a miniaturized multi-sensor and communication module to reduce the weight of the device and increase wearability, and to this end, the multi-sensor and the communication module may include any one of (1) a Bluetooth module M1 (see FIG. 14A), (2) a Bluetooth chip M2 (see FIG. 14B), or (3) an analog front end (AFE)-dedicated chip M3 (see FIG. 14C).

A method of miniaturizing the multi-sensor and data wireless transmission module (communication module) is summarized in Table 1.

The interface device 100 according to the present disclosure may be a multi-channel soft-sensor-based interface device in a glove type capable of recognizing the degree of elasticity of finger joints.

The sensing module 110 includes a plurality of strain sensors and collects strain sensing signals of the plurality of strain sensors. The strain sensors may be mounted on the finger joint portions, and for example, 10 strain sensors may each be mounted on one of the finger joint portions. The strain sensors may generate different strain sensing signals (e.g., voltages) because their resistance changes according to the elasticity of the finger joints. Further, the sensing module 110 may further include an acceleration sensor. Strain sensing signals and acceleration sensing signals that are generated by the sensing module 110 are transmitted to the switching unit 120.

The switching unit 120 selects any one of the strain sensing signals of the plurality of strain sensors. The switching unit 120 may select any one of the strain sensing signals of the plurality of strain sensors according to an input selection signal. The switching unit 120 may be implemented using an MUX. The switching unit 120 may be implemented as the switching circuit illustrated in FIG. 2. When the switching unit 120 receives the strain sensing signals of the plurality of strain sensors and the acceleration sensing signal, the switching unit 120 may select any one of

TABLE 1

| Categories/features | Technical content |
|---|---|
| (1) Use of Bluetooth module (Use of commercial Bluetooth module) | Hardware structure for multi-strain sensor time-division measurement technology using single differential amplifier/Bluetooth module-based sensor measurement module firmware/boot code for firmware upload through Universal Serial Bus (USB) or Bluetooth/firmware for Bluetooth module control and sensor control |
| (2) Use of Bluetooth chip (sharing Bluetooth chip and MCU) | Communication module using Bluetooth chip/hardware control of time-division measurement of multiple strain sensors based on single differential amplifier utilizing MCU in Bluetooth chip/firmware for driving Bluetooth chip/integration of MCU for Bluetooth communication and MCU for sensor control for module miniaturization/firmware architecture for Bluetooth communication and sensor control/firmware for real-time operating system (RTOS)-based Bluetooth communication and sensor control |
| (3) Use of AFE-only chip (optimization of size and possible performance compared to interface chip) | Introducing dedicated AFE chip for time-division measurement of multiple strain sensors based on single differential amplifier into hardware and firmware of (2)/AFE chip dedicated to multiple strain sensors: dedicated AFE chip for strain sensors based on chip parameters optimized for target strain sensor/maximizing performance and minimizing possible module size using dedicated AFE chip |

Figure 15:
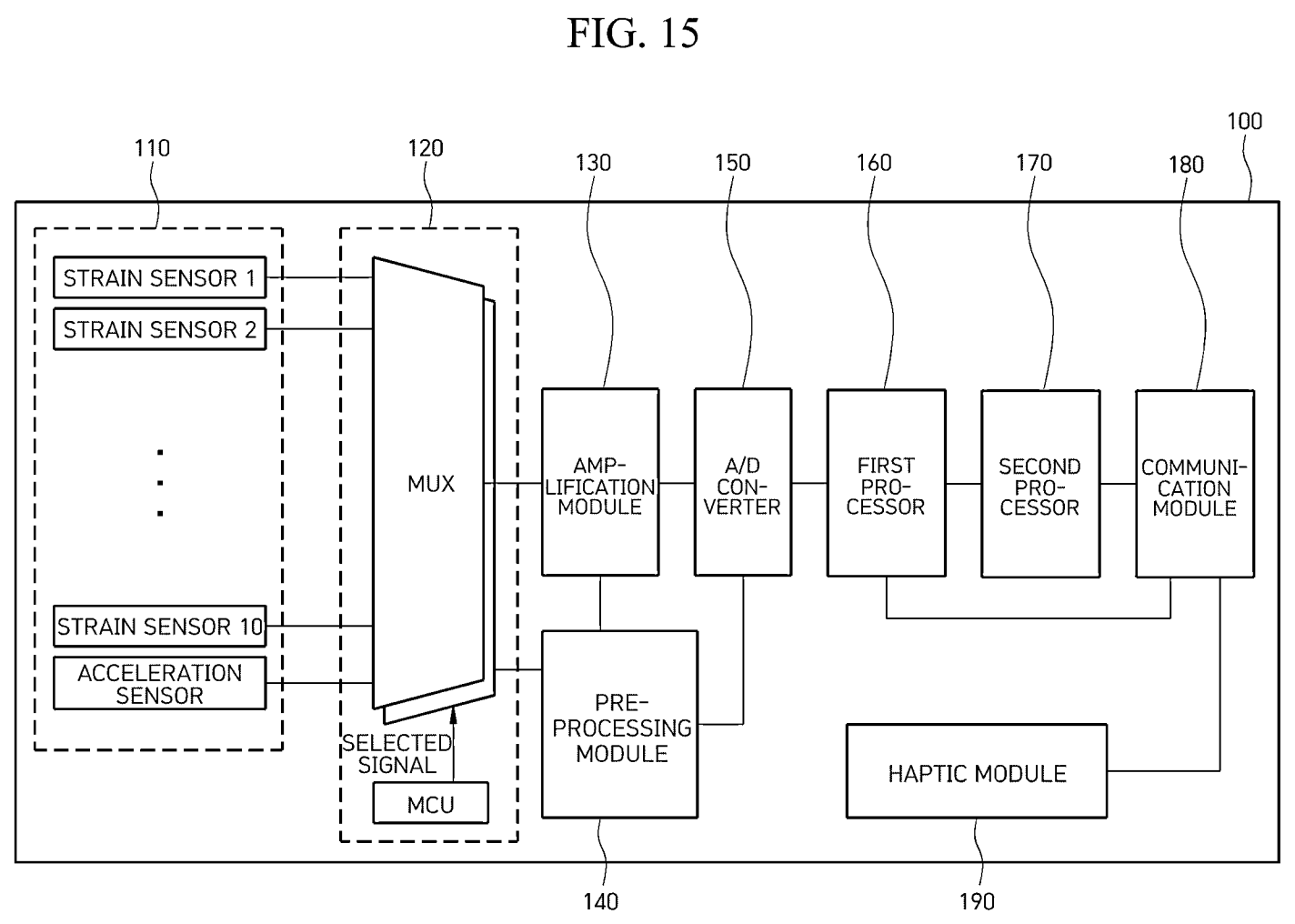

FIG. 15 is a block diagram illustrating a configuration of the multi-channel soft-sensor-based interface device according to one embodiment of the present disclosure.

An interface device 100 according to one embodiment of the present disclosure includes a sensing module 110, a switching unit 120, an amplification module 130, a preprocessing module 140, an ADC 150, a first processor 160, a second processor 170, a communication module 180, and a haptic module 190. Although not illustrated in FIG. 15, the interface device 100 may further include a battery 200 and a battery management module 210. The components of the interface device 100 according to the present disclosure are not limited to the embodiment illustrated in FIG. 15, and may be added, changed, or deleted as necessary. For example, the preprocessing module 140 or the haptic module 190 may be deleted as necessary.

the sensing signals. The switching unit 120 performs time-division measurement as illustrated in the example of FIG. 3. When the sensing module 110 includes an acceleration sensor, the switching unit 120 may perform scheduling on the sensor measurement value in the same form as the example of FIG. 9.

The amplification module 130 amplifies the strain sensing signal or acceleration sensing signal selected by the switching unit 120. The amplification module 130 may be implemented as a low-current/low-noise amplifying circuit using a differential amplifier as illustrated in the example of FIG. 1.

The preprocessing module 140 converts the sensing signal selected by the switching unit 120 using a first variable resistor (see FIG. 4B). In this case, the amplification module 130 amplifies the sensing signal converted by the preprocessing module 140. The preprocessing module 140 may change a resistance value of the first variable resistor for each sensor (for each sensing signal) on the basis of the scheduling of the sensing signal. For example, the resistance value of the first variable resistor applied to a first strain sensor and a second strain sensor among the plurality of strain sensors included in the sensing module 110 may be applied differently by the preprocessing module 140.

The preprocessing module 140 adjusts a gain of a differential amplifier included in the amplification module 130 using a second variable resistor (see FIG. 5). In this case, the preprocessing module 140 adjusts the gain on the basis of an input voltage range of the ADC 150. The preprocessing module 140 may change the resistance value of the second variable resistor for each sensor (for each sensing signal) on the basis of the scheduling of the sensing signal. For example, the resistance value of the second variable resistor applied to the first strain sensor and the second strain sensor among the plurality of strain sensors included in the sensing module 110 may be applied differently by the preprocessing module 140. Ultimately, the gain of the differential amplifier included in the amplification module 130 may be changed for each sensing signal by the preprocessing module 140.

When the interface device 100 is in a calibration mode, the preprocessing module 140 sets the resistance value (initial resistance) of the first variable resistor (which may be in the same form as the variable resistor illustrated in FIG. 4B) for each strain sensor on the basis of a resistance change range of the plurality of strain sensors. Further, the preprocessing module 140 sets the gain of the differential amplifier included in the amplification module 130 by adjusting the second variable resistor on the basis of the input voltage range of the ADC in the calibration mode, and stores the resistance value of the first variable resistor and the resistance value of the second variable resistor in a non-volatile memory for future use.

For example, a user may change the resistance of the strain sensor by repeatedly performing first clenching and unclenching motions in the calibration mode while wearing the interface device 100 on his/her hand. In this case, a voltage changes according to a change in resistance of the strain sensor, and the preprocessing module 140 may measure the change in resistance according to the user's motion on the basis of the measured voltage value. In order to improve precision, the resistance value (initial resistance) of the first variable resistor should be set, and a voltage range of the sensing signal may vary depending on the setting of the initial resistance. The preprocessing module 140 may set the resistance value (initial resistance) of the first variable resistor so that the voltage range is formed according to a predetermined reference. When a sensing signal passes through an amplifying circuit, a voltage increases, and the preprocessing module 140 controls a gain of an amplifier of the amplification module 130 to adjust the voltage that appears as a result of the amplification. The preprocessing module 140 controls the gain of the amplifier on the basis of a measurement range of the ADC to adjust the change in voltage, and stores the initial resistance value and amplifier gain value in a nonvolatile memory for future repeated use. That is, the preprocessing module 140 may set the gain of the amplifier on the basis of the measurement range of the ADC, that is, the input voltage range. Further, the preprocessing module 140 may adjust a scale for the amplified sensing signal. That is, the preprocessing module 140 may adjust a zero point and a scale for the amplified sensing signal so that the measurement value with the adjusted zero point and scale is transmitted to the ADC 150. The above-described zero point and scale adjustment may be performed in a software manner.

The ADC 150 converts the sensing signal amplified by the amplification module 130 into a digital signal and transmits the converted digital signal to the first processor 160.

The first processor 160 converts the digital signal (digital signal converted from the amplified sensing signal) into a motion signal and transmits the converted motion signal to the second processor 170 or the communication module 180. For example, the first processor 160 may generate signals of motions, such as a motion of folding a thumb, a motion of spreading all fingers, a motion of clenching a fist, or the like, on the basis of the strain sensing signal, and transmit the generated motion signal to the second processor 170 or the communication module 180. As another example, the first processor 160 may synthesize digital signals and format the digital signals into a message. In this case, the first processor 160 may transmit the formatted message to the second processor 170 or the communication module 180.

The second processor 170 may generate a command on the basis of the motion signals received from the first processor 160 and transmit the generated command to the communication module 180. For example, the second processor 170 may generate a command called "STOP" on the basis of the motion signal indicating a first clenching motion and transmit the generated command to the communication module 180. As another example, the second processor 170 may generate a command on the basis of the message received from the first processor 160.

The communication module 180 wirelessly transmits the motion signal or message received from the first processor 160 to an external device or server. Further, the communication module 180 may wirelessly transmit the command received from the second processor 170 to the external device or server. For a specific example, the communication module 180 may be composed of a Bluetooth module and an antenna, or may be composed of a Bluetooth chip and an antenna. The communication module 180 may use another wireless communication method in conjunction with Bluetooth or in place of Bluetooth. For example, the communication module 180 may use Bluetooth Low Energy (BLE), Wi-Fi direct, near-field communication (NFC), ultrawide band (UWB) communication, or infrared communication, and may perform wireless transmission or reception using a mesh network such as ZigBee or Z-Wave.

Meanwhile, the communication module 180 may receive a signal from the external device or server. The communication module 180 transmits a signal received from an external device to the haptic module 190.

The haptic module 190 transmits vibration or a tactile sensation to the user of the interface device 100. The haptic module 190 may control the level of the vibration or tactile sensation differently according to the signal received from the communication module 180.

In addition, the interface device 100 may include the battery 200 and the battery management module 210, the battery 200 supplies power to the inside of the interface device 100, and the battery management module 210 performs a function of preventing overcharge or overdischarge of the battery 200 and may include the overcharge prevention chip (see FIG. 12) or the overdischarge prevention chip. Further, the battery management module 210 may further include a tact switch, and may manage the battery capacity within a predetermined charge level range (e.g., 20% to 80%) using the tact switch. Details regarding the function and implementation example of the battery management module 210 have been described above with reference to FIGS. 11 and 12. That is, the content of FIGS. 11 and 12 may be applied to the battery management module 210 of the interface device 100.

The content of FIGS. 1 to 14 (FIGS. 14A, 14B, and 14C) may be applied to that of FIG. 15. For example, the content of FIGS. 4 (FIGS. 4A and 4B) to 8 may be applied to the preprocessing module 140, and the content of FIGS. 13 and 14 (FIGS. 14A, 14B, and 14C) may be applied to the communication module 180.

FIG. 16 is a flowchart for describing an operating method of the multi-channel soft-sensor-based interface device according to one embodiment of the present disclosure. The operating method of the multi-channel soft-sensor-based interface device according to one embodiment of the present disclosure includes operations S340 to S370, and may further include operations S310 to S330 or operations S380 to S400.

Operation S310 is an initial resistance setting operation. In this operation, it is assumed that the interface device 100 is in a calibration mode. The interface device 100 sets the resistance value of the first variable resistor described above for each strain sensor on the basis of the resistance change range of the plurality of strain sensors. The resistance change range may be a resistance change range exhibited by the strain sensor due to the user's motions of bending and then spreading all of his/her finger joints.

In operation S310, the resistance value of the first variable resistor may be set based on a maximum measurement range of each strain sensor. For example, the resistance value of the first variable resistor may be set based on a maximum measurement value of each strain sensor.

Operation S320 is an amplifier gain setting operation. The interface device 100 sets the gain of the differential amplifier of the amplification module 130 on the basis of the input voltage range of the ADC 150. For example, the interface device 100 may set the gain of the differential amplifier so that an output voltage range of the amplification module 130 obtained while the user repeats motions of bending and then spreading all of his/her finger joints is formed within the input voltage range of the ADC 150. Ultimately, the interface device 100 sets an amplification gain of the amplification module 130.

As another example, in operation S320, the interface device 100 may adjust the input voltage range of the ADC 150 on the basis of an input range of the differential amplifier. For example, the interface device 100 may adjust the input voltage range of the ADC 150 to be within the input range of the differential amplifier.

Operation S330 is a scale adjustment operation. The interface device 100 may adjust the zero point and scale for the amplified sensing signal so that the measurement value with the zero point and scale adjusted is transmitted to the ADC 150. The above-described zero point and scale adjustment may be performed in a software manner.

Although not illustrated in the drawing, after operation S320 or S330, an operation of storing the resistance value set in operation S310 and the amplification gain set in operation S320 in a non-volatile memory may be further included (see description of FIGS. 4 to 8).

Operation S340 is a sensing signal collection and switching operation. The interface device 100 collects strain sensing signals of the plurality of strain sensors and selects any one of the strain sensing signals of the plurality of strain sensors. When the sensing module 110 includes an acceleration sensor, the interface device 100 selects any one of the sensing signals of the plurality of strain sensors and the acceleration sensing signal.

Operation S350 is a sensing signal conversion operation. The interface device 100 may convert the sensing signal by changing the resistance value of the first variable resistor for each sensor (for each sensing signal) on the basis of the scheduling of the sensing signal. That is, the interface device 100 converts the sensing signal selected in operation S340 using the first variable resistor. In some cases, operation S350 may be omitted.

Operation S360 is a signal amplification operation. The interface device 100 amplifies the selected sensing signal, or the sensing signal converted in operation S350.

Operation S370 is an analog-to-digital conversion operation. The interface device 100 converts the amplified sensing signal into a digital signal.

Operation S380 is a motion signal generation operation. The interface device 100 generates a motion signal on the basis of the digital signal. For example, the interface device 100 may generate a motion signal meaning a "fist clenching motion" on the basis of the digital signal.

Operation S390 is a command generation operation. The interface device 100 generates a command on the basis of the motion signal. For example, the interface device 100 may generate a command called "STOP" on the basis of the motion signal meaning the "fist clenching motion."

Operation S400 is a command transmission operation. A communication module 180 of the interface device 100 wirelessly transmits the command generated in operation S390 to an external device or server. The wireless communication method may be Bluetooth, but the scope of the present disclosure is not limited thereto.

The operation method of the multi-channel soft-sensor-based interface device 100 has been described above with reference to the flowchart presented in the drawing. For simplicity, the method has been illustrated and described as a series of blocks, but the present disclosure is not limited to the order of the blocks, and some blocks may occur in a different order or simultaneously with other blocks than illustrated and described herein, and various other branches, flow paths, and orders of blocks that achieve the same or similar results may be implemented. Further, not all of the illustrated blocks may be required to implement the method described herein.

Meanwhile, in the description referring to FIG. 16, each operation may be further divided into additional operations or combined into fewer operations, depending on the implementation example of the present disclosure. Further, some operations may be omitted as necessary, and the order between the operations may be changed. In addition, even when other omitted content is present, the content of FIGS. 1 to 15 may be applied to the content of FIG. 16. Further, the content of FIG. 16 may be applied to the content of FIGS. 1 to 15.

While example embodiments of the present disclosure and their advantages have been described above in detail, it should be understood by those skilled in the art that various changes, substitutions and alterations may be made herein without departing from the scope of the invention as defined by the following claims.

What is claimed is:

1. A multi-channel soft-sensor-based interface device in a glove type configured to recognize a degree of elasticity of finger joints, the device comprising:

a sensing module comprising a plurality of strain sensors and configured to collect strain sensing signals of the plurality of strain sensors;

a switching unit configured to select any one of the strain sensing signals of the plurality of strain sensors;

an amplification module configured to amplify the strain sensing signal selected by the switching unit;

an analog-to-digital (A/D) converter configured to convert the amplified sensing signal into a digital signal; and a preprocessing module configured to adjust a gain of a differential amplifier included in the amplification module using a second variable resistor, wherein the preprocessing module is configured to adjust the gain on the basis of an input voltage range of the A/D converter.

2. The multi-channel soft-sensor-based interface device of claim 1, wherein the strain sensors are mounted on finger joint portions.

3. The multi-channel soft-sensor-based interface device of claim 1, further comprising:

a first processor configured to convert the digital signal into a motion signal; and a communication module configured to wirelessly transmit the motion signal to an external device.

4. The multi-channel soft-sensor-based interface device of claim 1, wherein the preprocessing module is further configured to convert the strain sensing signal selected by the switching unit using a first variable resistor, and wherein the amplification module is configured to amplify the strain sensing signal that is converted by the preprocessing module.

5. The multi-channel soft-sensor-based interface device of claim 1, further comprising a battery management module configured to control a state of a power source connected to a battery of the interface device so that a charge level of the battery is within a predetermined charge level range.

6. The multi-channel soft-sensor-based interface device of claim 5, wherein the charge level range ranges from 20% to 80%.

7. An operating method of a multi-channel soft-sensor-based interface device, comprising:

collecting strain sensing signals of a plurality of strain sensors and selecting any one of the strain sensing signals of the plurality of strain sensors;

converting the selected strain sensing signal using a first variable resistor;

amplifying the selected strain sensing signal;

converting the amplified sensing signal into a digital signal;

setting a resistance value of the first variable resistor for each strain sensor on the basis of a resistance change range of the plurality of strain sensors; and setting a gain of a differential amplifier used in amplifying the selected strain sensing signal on the basis of an input voltage range of an analog-to-digital (A/D) converter.

8. The operating method of claim 7, wherein the resistance value of the first variable resistor is set based on a maximum measurement value of each strain sensor.

9. The operating method of claim 7, further comprising storing the resistance value and the gain of the differential amplifier in a built-in memory.

* * * * *